(12) United States Patent
Catlin

(10) Patent No.: US 6,728,512 B1
(45) Date of Patent: Apr. 27, 2004

(54) TEACHING SYSTEM

(76) Inventor: David Catlin, c/o Valiant Technology LTD Valiant House 3 Grange Mills, Weir Road, London (GB), SW12 ONE ( * ) Notice: Subject to any disclaimer, the term of this patent is extended or adjusted under 35 U.S.C. 154(b) by 31 days.

(21) Appl. No.: 10/088,298

(22) PCT Filed: Sep. 13, 2000

(86) PCT No.: PCT/GB00/03515

§ 371 (c)(1),
(2), (4) Date: Mar. 13, 2002

(87) PCT Pub. No.: WO01/20585

PCT Pub. Date: Mar. 22, 2001

(30) Foreign Application Priority Data

Sep. 14, 1999 (GB) ................................ 9921697

(51) Int. Cl.⁷ .............................. G09B 5/14; G09B 7/00
(52) U.S. Cl. ....................................... 434/350; 434/362
(58) Field of Search ................................ 434/322, 323, 434/350, 353, 362

(56) References Cited

U.S. PATENT DOCUMENTS

| | | | |
|---|---|---|---|
| 4,682,958 A | | 7/1987 | Slavik et al. |
| 5,195,033 A | | 3/1993 | Samph et al. |
| 5,294,229 A | | 3/1994 | Hartzell et al. |
| 5,769,643 A | * | 6/1998 | Stevens, III ................. 434/350 |
| 5,810,605 A | * | 9/1998 | Siefert ......................... 434/362 |
| 6,181,910 B1 | * | 1/2001 | Jerrold-Jones et al. ...... 434/353 |
| 6,201,948 B1 | * | 3/2001 | Cook et al. ................... 434/350 |

FOREIGN PATENT DOCUMENTS

JP     405134595 A    *    5/1993    ................. 434/322

* cited by examiner

*Primary Examiner*—John Edmund Rovnak
(74) *Attorney, Agent, or Firm*—Townsend and Townsend and Crew LLP

(57) ABSTRACT

A teaching system having a plurality of self-contained teaching units (5, 6, 7). Each unit has a programmable processor to carry out a study programme, a display (9), an input device (10) and a memory (12) for storing data input by a user. The system also has a central processor (1), to which each reaching unit can be connected directly or indirectly, for generating and downloading insructions to enable the teaching units to be programmed, and for receiving and processing the content of each teaching unit memory.

9 Claims, 4 Drawing Sheets

TEACHING SYSTEM

The invention relates to a teaching system.

In recent years, teachers of pupils of all ages have started to make use of computerized teaching systems such as Integrated Learning Systems (ILS), which enable pupils to interact with a computer such as a personal computer (PC). In some examples the PC is programmed to provide a mixture of tutorial information such as explanations of ideas and the like together with sets of questions related to the tutorial information which the pupil must answer. These answers can then be analyzed and further questions then follow a path depending upon the responses to the questions. The problem with known teaching systems is that they are very expensive to implement. Typically, each pupil must be provided with a PC at which to work making it prohibitive for all pupils in a typical class of 30 to work with a computer at the same time. Even for smaller groups, the cost of providing PCs for each member of the group is expensive.

other products include educational toys but these have limited processing power, and graphical calculators which have been adapted to take basic mathematical activities from a computer. Again, they have limited abilities.

In accordance with the present invention, a teaching system comprises a plurality of self-contained teaching units, each unit having a programmable processor which is individually programmable to carry out a study programme, a display, an input device and a memory for storing data input by a user; and a central processor, to which each teaching unit can be connected directly or indirectly, for generating and downloading instructions to enable each teaching unit to be programmed, and for receiving and processing the content of each teaching unit memory.

With this invention, the teaching system is distributed between a central processor on the one hand and a plurality of self-contained teaching units on the other hand. This enables the complex and expensive programming required to operate the teaching system to be provided primarily in the central processor which then services the plurality of self-contained teaching units by supplying appropriate instructions to their local processors and receiving the pupil's input (for example answers to questions) for later analysis. Each teaching unit can then be a very simple device which is much cheaper than a conventional PC thus enabling several such teaching units to be provided at relatively low cost. At the same time, each teaching unit is self-contained so that it can be used while disconnected from the central processor and could even be taken home by a pupil if desired.

In one arrangement, each teaching unit can be connected directly to the central processor to enable instructions to be downloaded and the contents of its memory to be uploaded. However, where there are several teaching units in the system, this can be time consuming and therefore preferably the system further comprises an intermediate storage unit having a housing storing at least one teaching unit and a recording unit which connects with the or each teaching unit when the teaching unit is located within the intermediate storage unit and into which the content of the teaching unit memory can be uploaded and from which instructions from the central processor can be downloaded.

Typically, the intermediate storage unit can store more than one teaching unit, for example six such units, thus not only providing a store when the units are not in use but at the same time enabling the contents of the local memories to be uploaded to the recording unit.

The recording unit could be permanently or temporarily connected to the central processor and conveniently is detachable from the rest of the intermediate storage unit to allow it to be connected to the central processor. Typically, the recording unit has a capacity to store the results of more than one memory and in a typical system will be able to store the results from more than one memory and corresponding to say a week's use by pupils.

Although each teaching unit could be powered from a mains supply, in order to maximize portability, it preferably has an on-board, rechargeable power source. In that event, preferably each intermediate storage unit includes a power connection which can be connected to a corresponding teaching unit when the teaching unit is loaded into the intermediate storage unit so as to recharge its on-board power source.

The study programmes provided by the system can be of any conventional form and a particularly important application is in the teaching of mathematics although other subjects such as languages could be taught.

An example of a teaching system according to the invention will now be described with reference to the accompanying drawings, in which.

Figure 1:
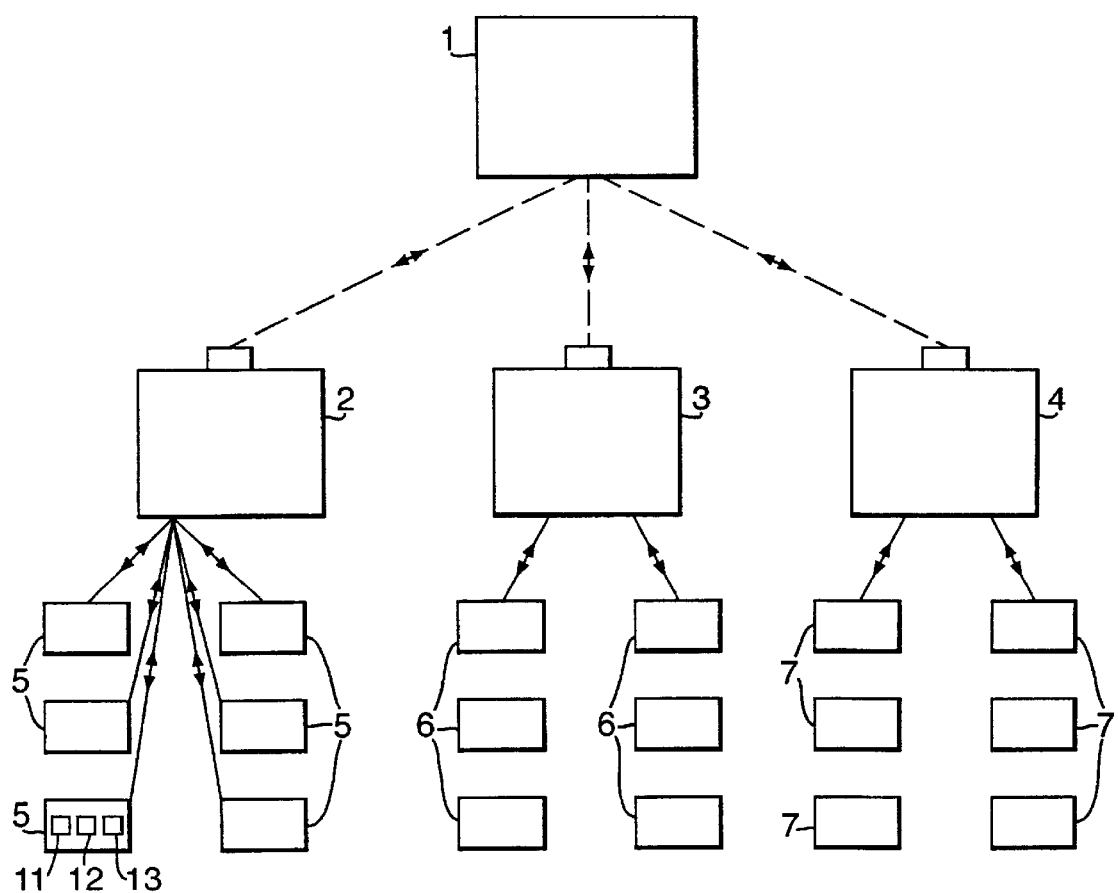
FIG. 1 is a schematic block diagram of the system.

The teaching system shown in the drawings comprises a central processor 1, such as a personal computer (PC); a number (in this case three) of intermediate storage units 2–4; and, associated with each storage unit 2–4, a set of six teaching units 5–7.

Each teaching unit 5–7 has a similar construction and includes a housing 8 (FIG. 2) supporting an LCD display 9 and a set of keys 10. Each unit 5–7 also includes a microprocessor 11, a memory such as RAM or flash memory 12, and a rechargeable power source 13. These are shown schematically for one of the units 5 in FIG. 1.

The microprocessor 11 of each unit 5–7 can be set up to carry out a study programme which involves the display of information on the LCD display 9. That information may include some teaching information and also questions enabling a user to enter answers. These answers are stored in the memory 12. The programs implemented by the microprocessor 11 can be of a simple or sophisticated form and can also mark answers and support educational games. The flow of the program may alter depending upon the level of accuracy of the user's responses.

For example, a particular topic might be covered by a particular study programme, the topic being subdivided into a number of stages of increasing difficulty, each stage also providing questions of a corresponding difficulty. Less able students might start at the first of four stages whereas more gifted students might start at the second stage. Students may then move up or down between the stages depending upon their assessed performance in answering the corresponding questions.

The microprocessor also allows teachers the ability to interrogate the unit about the student's performance, providing them with various levels of analysis and details of their questions and answers. The microprocessor may also provide an Alert Mode which notifies teachers when students are having problems in real time mode. This might be the case if their performance results in a change of stage or if the microprocessor assesses that they are not using the unit appropriately. In this way the teacher is able to closely monitor and guide the progress of each student.

It will be appreciated that each unit 5–7 has a relatively simple form, the complexities being handled in the central processor 1. The central processor 1 includes support software which can carry out one or more of the following functions:

Allows teachers to organise students into classes and ability groups.

Lets the teacher create lesson plans for each ability group.

Lets the teacher assign activities from the Application Software Packs to the teaching objectives of the lesson plan.

Allows the teacher to create an activity set up suitable for the ability group and the time in the lesson plan.

Provides the teacher with assessments of the student work.

Provides diagnostic assessment reports letting teachers identify areas of weakness, strength and satisfactory achievements, for individuals or groups of students.

Allows diagnostic audit to level of questions and answers provided by students.

Provides reports for head teachers, parents, other teachers, students etc.

Figure 2:
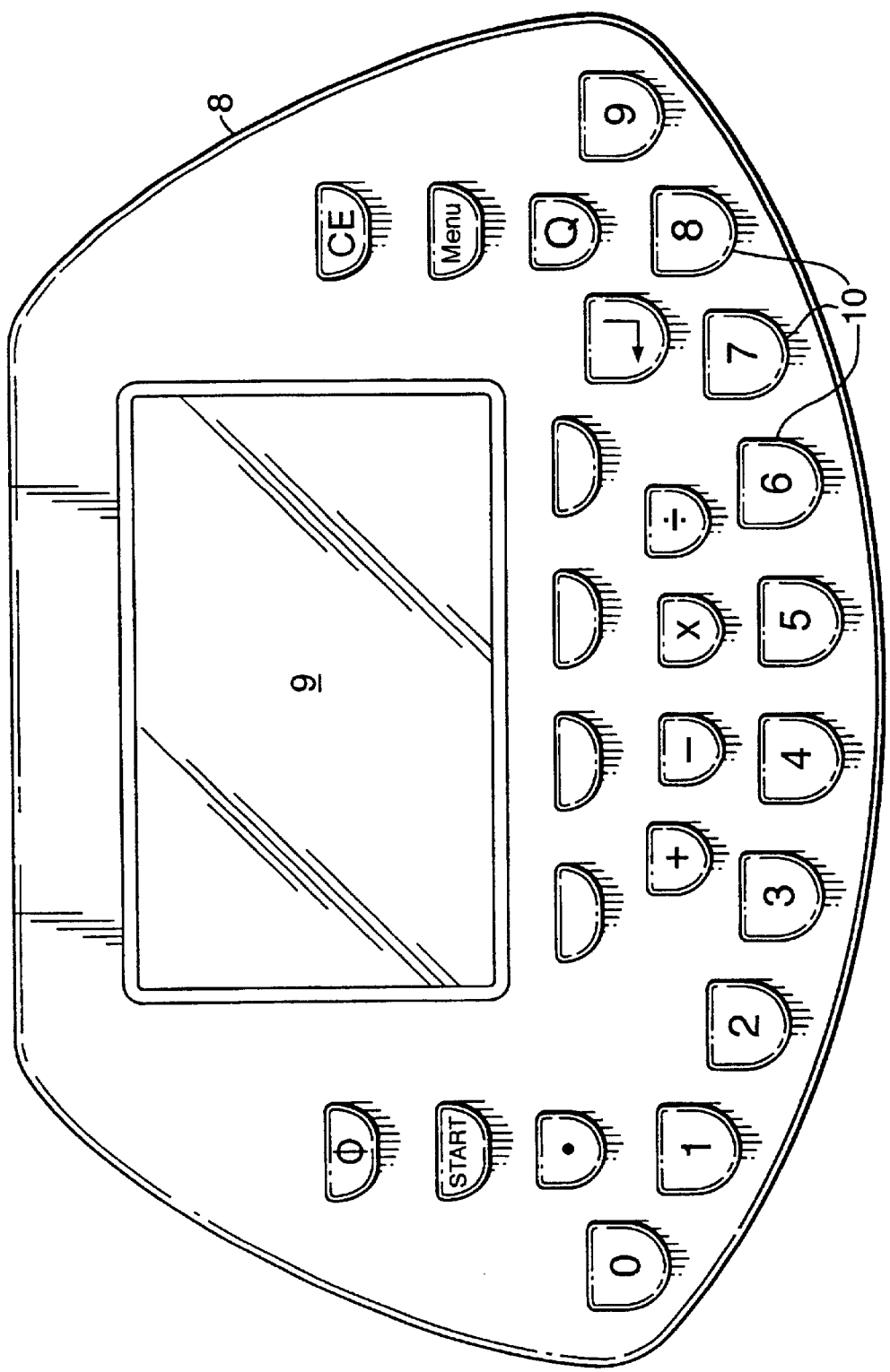
FIG. 2 is a plan of one of the teaching units shown in FIG. 1.

In order to interact with the units 5–7, the central processor 1 can either couple directly with each unit or, as shown in FIG. 1, via respective ones of the storage units 2–4. The storage units 2–4 have a similar construction and so the unit 2 will be described in detail.

Figure 3:
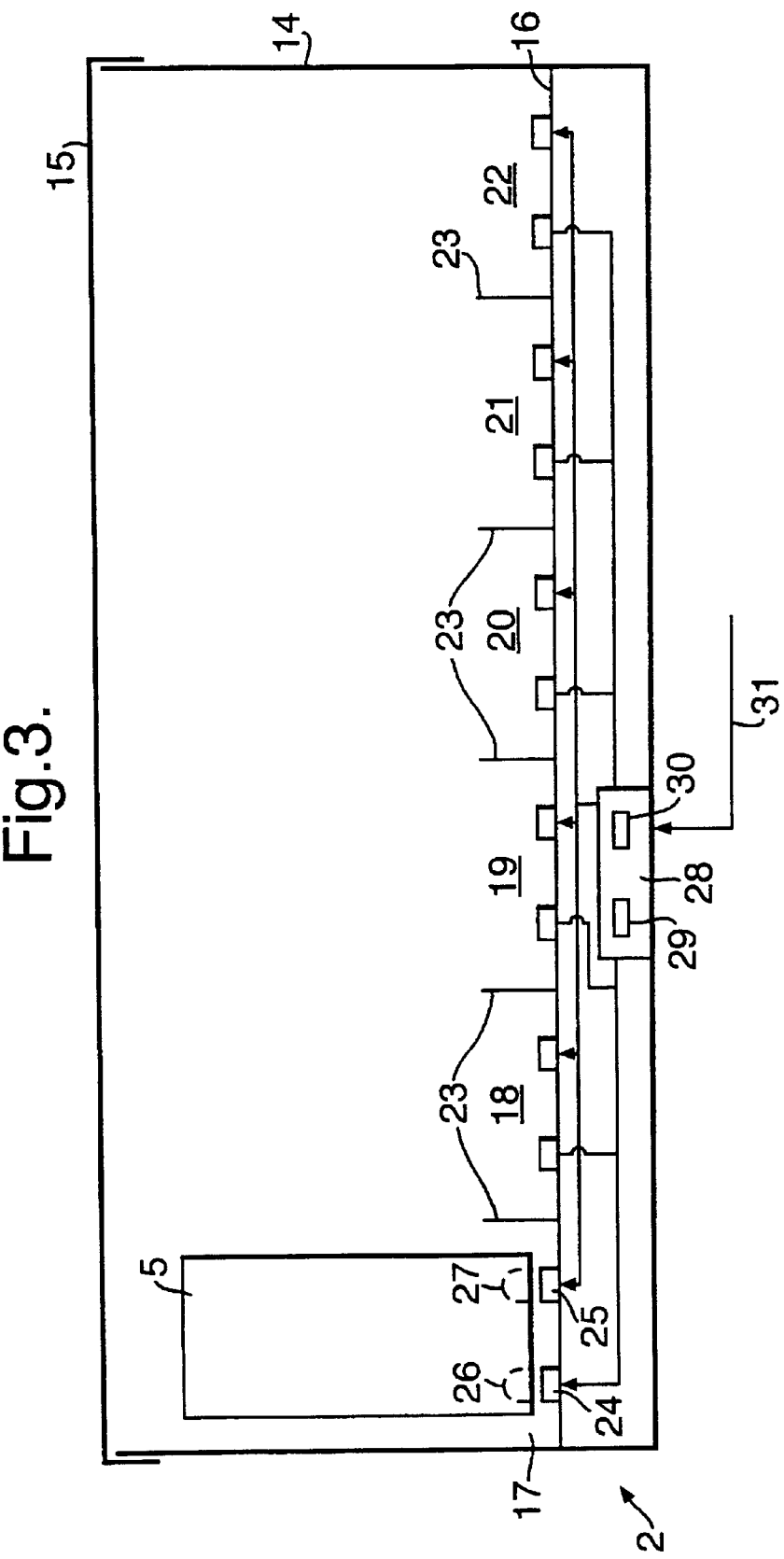
FIG. 3 is a schematic cross-section through one of the intermediate storage units of FIG. 1; and, FIG. 4 is a flow diagram illustrating operation of the system.

As shown in FIG. 3, the unit 2 comprises a box 14 having a lid 15 (which can be locked in position) and a raised base 16. The raised base 16 is divided into six compartments 17–22 divided by walls 23. Each compartment has a pair of male connectors 24,25 which engage in corresponding female connectors 26,27 respectively in one of the teaching units 5. It will be seen in FIG. 3 that the teaching unit 5 fits conveniently into the compartment 17 so that it can be stored. However, in addition to providing a simple storage facility, the storage unit 2 enables data in the memory 12 to be downloaded via the connectors 24,26 to a recording unit 28. The recording unit 28 includes a microprocessor 29 and a memory, such as Flash RAM, 30. The microprocessor 29 detects in a conventional manner when a teaching unit 5 has been located in one of the compartments and then transfers the data in the memory 12 to the memory 30.

In addition, while the unit 5 sits in the compartment 17, its rechargeable power source 13 is recharged via the male connector 25 and a corresponding female connector 27 connected to the power source 13. Power is supplied from a conventional mains source to the recording unit 28 via a line 31.

The capacity of the memory 30 is such that it can store typically a week's worth of information from each of the six units 5.

The recording unit 28 can be temporarily connected to the central processor 1. Typically, this is achieved by disconnecting the recording unit 28 from the storage unit 2 and mounting it into a reading device (not shown) coupled with the central processor 1. The central processor 1 can then upload the information from the recording unit for subsequent processing.

It will be noted, therefore, that data is transmitted in both directions between the central processor 1 and the storage units 2–4 and also in both directions between the storage units 2–4 and the teaching units 5–7. This enables significant flexibility to be achieved in operation of the system while also allowing sophisticated study programme applications to be implemented.

Figure 4:
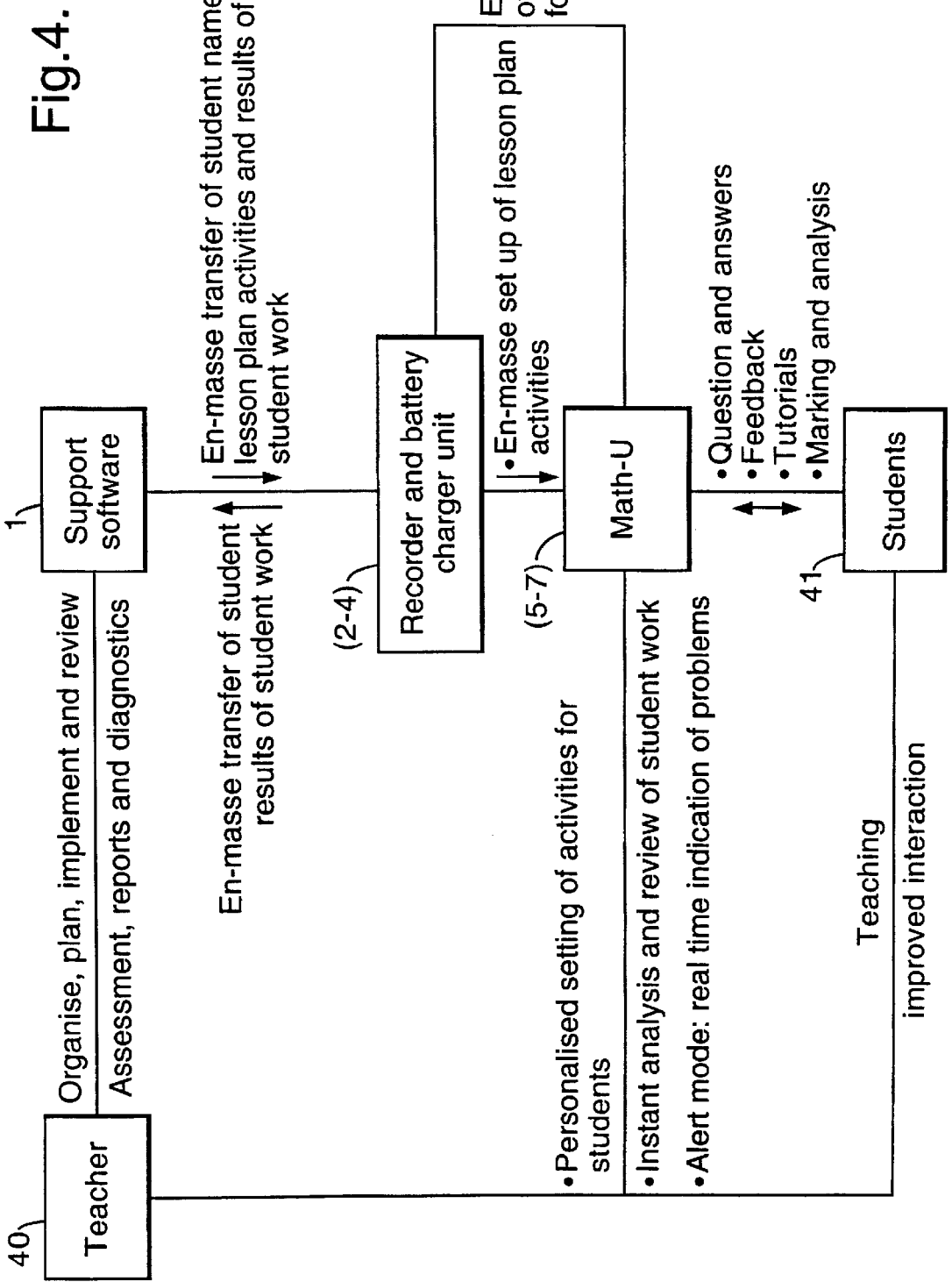

The general operation of the teaching system is shown in FIG. 4. Basic support software relating to the subject to be taught is provided on the central processor 1 and this allows a teacher 40 to organise, plan etc. a number of study programmes, possibly different for each student. In addition, the teacher can review analyses of answers which have been uploaded from the teaching units 57.

The details of students, lesson plan activities and the like are downloaded to the memory 30 in each storage unit 2–4 and the microprocessor 29 in each storage unit then transfers appropriate lesson plans to each of the teaching units (possibly different lesson plans to each unit).

Students 41 then interact with the teaching units 5–7.

The microprocessor 11 in each teaching unit 5–7 can provide some immediate analysis of a students work and also an alert if the student is having trouble to enable a teacher to immediately deal with this. The answers are uploaded into the memory 30 once the teaching unit 5–7 is placed in its appropriate storage unit 2–4 and these results then uploaded to the central processor 1, as previously described.

What is claimed is:

1. A teaching system comprising:
    a plurality of self-contained teaching units, each unit having
        a programmable processor which is individually programmable to carry out a study programme,
        a display,
        an input device, and
        a memory for storing data input by a user;
    a central processor, to which each teaching unit can be connected directly or indirectly, for generating and downloading instructions to enable each teaching unit to be programmed, and for receiving and processing the content of each teaching unit memory; and
    an intermediate storage unit having
        a housing configured for storing at least one teaching unit, and
        a recording unit which connects with the or each teaching unit when the teaching unit is located within the intermediate storage unit and into which the content of the teaching unit memory can be uploaded and from which instructions from the central processor can be downloaded, wherein the recording unit has a capacity to store the content of more than one teaching unit memory.

2. A system according to claim 1, wherein each teaching unit has an on-board, rechargeable power source, the intermediate storage unit including a power connection which can be connected to a corresponding teaching unit when the teaching unit is loaded into the intermediate storage unit so as to recharge its on-board power source.

3. A system according to claim 1, wherein the recording unit is detachable from the rest of the intermediate storage unit.

4. A system according to claim 3, wherein each teaching unit has an on-board, rechargeable power source, the intermediate storage unit including a power connection which can be connected to a corresponding teaching unit when the teaching unit is loaded into the intermediate storage unit so as to recharge its on-board power source.

5. A system according to claim 1 or claim 3 or claim 2 or claim 4, the system being adapted to provide one or more educational tutorials.

6. A system according to claim 1 or claim 3 or claim 5 or claim 4, the system being adapted to provide questions to the user and wherein the answers provided by the user are used by the system to assess the performance of the user.

7. A system according to claim 6, wherein the level of difficulty of the questions provided to the user is dependent upon the assessed performance of the user.

8. A system according to claim 6, further comprising an alert mode arranged to alert a teacher to the assessed performance of the user.

9. A system according to claim 7, further comprising an alert mode arranged to alert a teacher to the assessed performance of the user.

* * * * *